US005330255A

United States Patent [19]
Stawicki

[11] Patent Number: 5,330,255
[45] Date of Patent: Jul. 19, 1994

[54] SEAT INTEGRATED INFLATABLE NECK SUPPORT

[75] Inventor: Edwin V. Stawicki, Highland, Mich.

[73] Assignee: Davidson TEXTRON INC., Dover, N.H.

[21] Appl. No.: 974,705

[22] Filed: Nov. 12, 1992

[51] Int. Cl.⁵ .............................................. A47C 1/10
[52] U.S. Cl. ..................................... 297/391; 297/397
[58] Field of Search ......... 297/391, 393, 397, DIG. 3; 5/636, 644

[56] References Cited

U.S. PATENT DOCUMENTS

| | | | |
|---|---|---|---|
| 3,017,221 | 1/1962 | Emery | 297/397 |
| 3,185,497 | 5/1965 | Lagace | 297/397 X |
| 3,510,150 | 5/1970 | Wilfert | 297/391 X |
| 3,680,912 | 8/1972 | Matsuura | 297/391 |
| 4,097,086 | 6/1978 | Hudson | 297/391 X |
| 4,114,948 | 9/1978 | Perkey | 297/391 X |
| 4,123,104 | 10/1978 | Andres et al. | 297/391 |
| 4,178,038 | 12/1979 | Yada et al. | 297/391 |
| 4,206,945 | 6/1980 | Kifferstein | 297/397 X |
| 4,285,081 | 8/1981 | Price | 297/393 X |
| 4,738,488 | 4/1988 | Camelio | 297/393 X |
| 4,744,601 | 5/1988 | Nakanishi | 297/DIG. 3 |
| 4,838,611 | 6/1989 | Talaugon | 297/391 |
| 4,865,388 | 9/1989 | Nemoto | 297/DIG. 3 |
| 4,946,191 | 8/1990 | Putsch | 297/DIG. 3 |
| 5,015,036 | 5/1991 | Fergie | 297/391 X |

FOREIGN PATENT DOCUMENTS

| | | |
|---|---|---|
| 39-0050 | 9/1988 | Fed. Rep. of Germany . |
| 61-1835 | 8/1986 | Japan . |
| 63-31248 | 4/1988 | Japan . |
| 63-6384 | 8/1988 | Japan . |

Primary Examiner—Peter M. Cuomo
Assistant Examiner—Jerry Redman
Attorney, Agent, or Firm—Reising, Ethington, Barnard, Perry & Milton

[57] ABSTRACT

An inflatable neck support is a U-shaped collar comprising an inflatable bladder and a decorative cover that provides a wide range of styling choices. The inflatable neck support is attached to a seat back or a head restraint in a variety of ways so that it is easily adjusted by the seat occupant to meet the seat occupant's comfort needs. When not in use, the inflatable neck support is deflated and stored in a number of convenient ways.

18 Claims, 3 Drawing Sheets

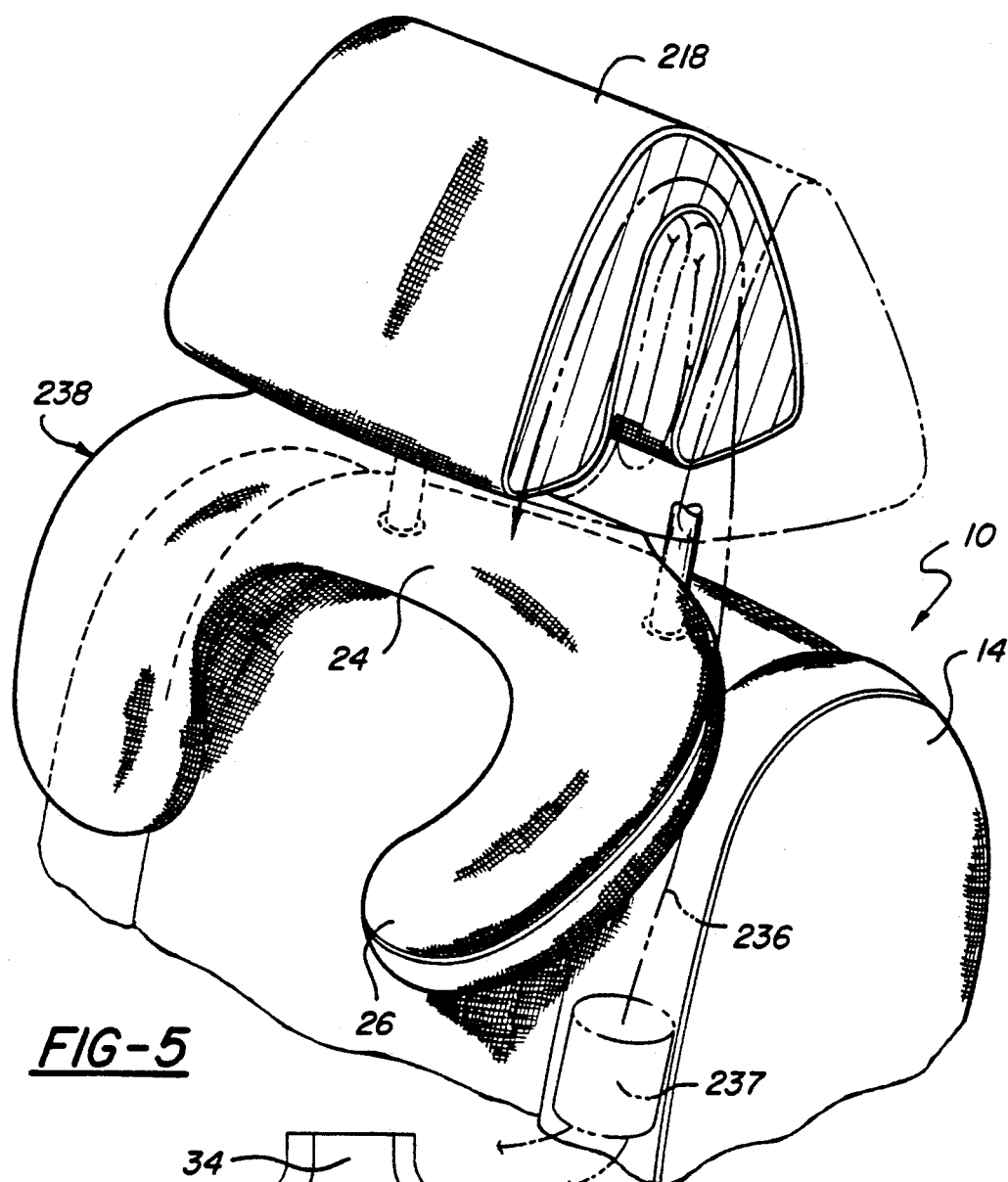
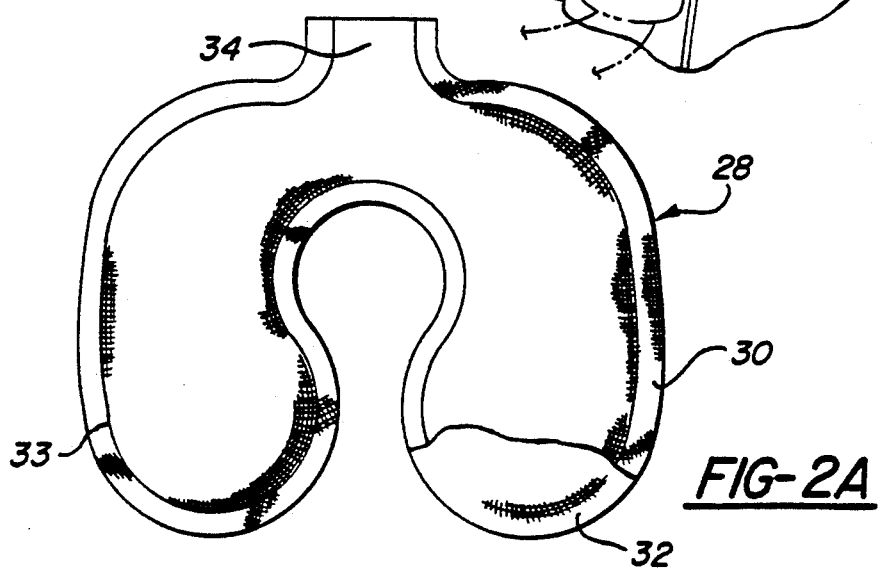

SEAT INTEGRATED INFLATABLE NECK SUPPORT

BACKGROUND OF THE INVENTION

This invention relates generally to neck supports and more particularly to inflatable neck supports that are used with vehicle seats of automobiles and commercial airlines.

U.S. Pat. No. 3,017,221 granted to William M. Emery Jan. 16, 1962 discloses an inflatable pillow that extends the back of an automobile seat, particularly one that has a low back. The pillow is completely separate from the seat and held in place by tapering portions wedged between the back of the seat occupant and the back of the seat. It supports the seat occupant's head when it faces one way and the seat occupant's neck when it faces the opposite direction. A major drawback of the Emery pillow is that it cannot be used with automobile and airline seats that require a head restraint because of its shape. Another drawback is that the Emery pillow requires constant and conscientious effort by the seat occupant to hold the pillow in place and consequently the pillow is not really comfortable or well suited for relaxation.

U.S. Pat. No. 4,123,104 granted to Rudolf Andres, Gerhard Busch and Werner Heiss Oct. 31, 1978 discloses an inflatable head rest for a rear seat of an automobile that is installed on the shelf behind the rear passenger seats. The head rest is automatically deflated and stored flat beneath a cover on the shelf when the rear seat is not occupied to minimize obstruction of the rear view. This device is very bulky and consequently it cannot be used with front automobile seats or airline seats. Another drawback is that it also cannot be used with automobile and airline seats that require head restraints.

U.S. Pat. No. 4,838,611 granted to Margie C. Talaugon Jun. 13, 1989 discloses a stuffed car seat pillow for use with a car seat for infants and other small children. The pillow is attached to shoulder straps of a harness assembly for the infant seat. The pillow has side cushions for supporting the sides of the child's head and a neck cushion for supporting the back of the child's neck that fits comfortably beneath the bulge at the rear of the head according to the Talaugon patent specification. The Talaugon pillow is simply not suitable for adult use or normal size automobile or airline seats.

SUMMARY OF THE INVENTION

The object of this invention is to provide a inflatable neck support that can be used with automobile or airline seats that have a head restraint in compliance with governmental standards or requirements.

A feature of the inflatable neck support of this invention is that the inflatable neck support is attached or attachable to the seat or head restraint so that the seat occupant does not have to use constant and conscientious effort to keep the inflatable neck support in position.

Another feature of the inflatable neck support of this invention is that the inflatable neck support is easily inflated by the seat occupant.

Another feature of the inflatable neck support of this invention is that the inflatable neck support is easily adjusted by the seat occupant to meet the particular comfort needs of the seat occupant.

Another feature of the inflatable neck support of this invention is that the inflatable neck support can be used with a vehicle seat that has any type head restraint including an adjustable head restraint or a fixed head restraint that is integrated into the seat back itself.

Another feature of the inflatable neck support of this invention is that the inflatable neck support is easily deflated and conveniently stored when it is not in use.

Still another feature of the inflatable neck support of this invention is that the inflatable neck support does not obstruct or otherwise interfere with functioning of a head restraint even an adjustable head restraint.

Still another feature of the inflatable neck support of this invention is that the inflatable neck support can be used with both front and rear automobile seats and airline seats as well.

Yet another feature of the inflatable neck support of this invention is that the inflatable neck support has a decorative cover that provides a wide range of styling possibilities for matching or complimenting the decor of the vehicle seat.

Still yet another feature of the inflatable neck support of this invention is that the inflatable neck support has a decorative cover that is removable for easy cleaning.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 2a is a plan view of a bladder of the inflatable neck support that is shown in FIGS. 1 and 2;

FIG. 5 is a perspective, partially sectioned view of yet another version of an inflatable neck support of the invention.

DESCRIPTION OF THE INVENTION

Figure 1:
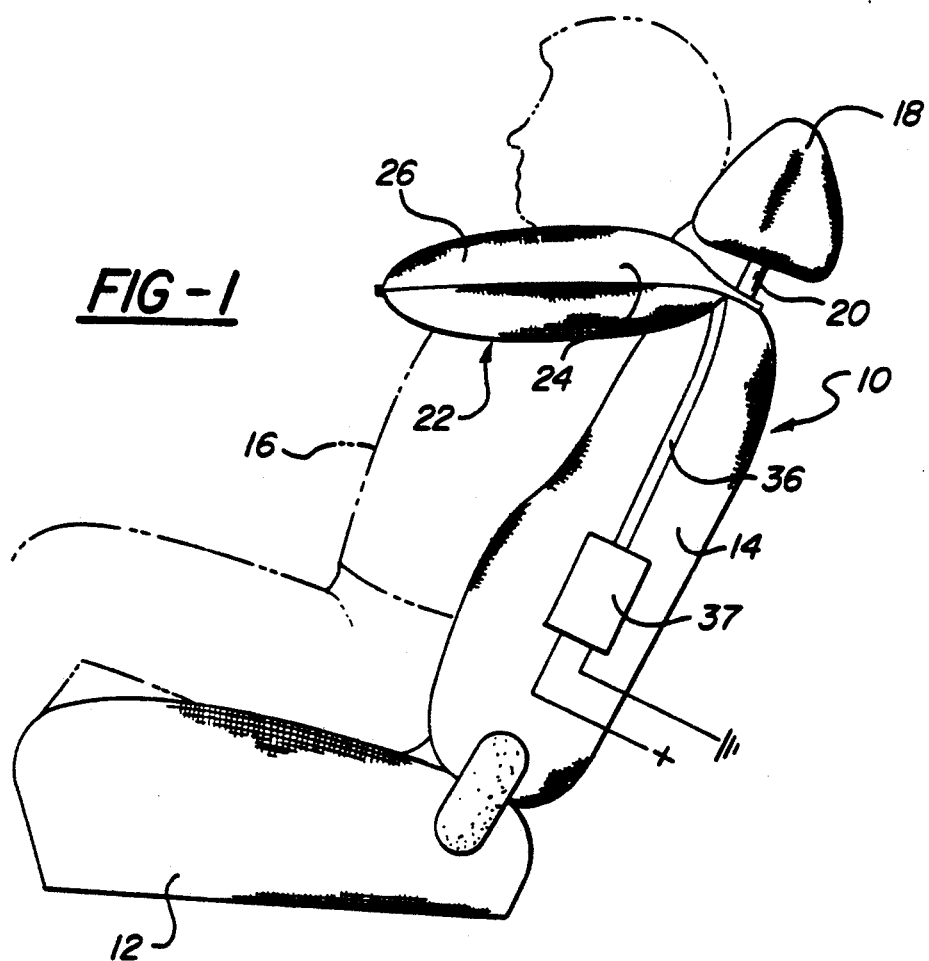
FIG. 1 is a side view of an automobile seat that has an adjustable head restraint and that is equipped with an inflatable neck support in accordance with this invention.
Figure 2:
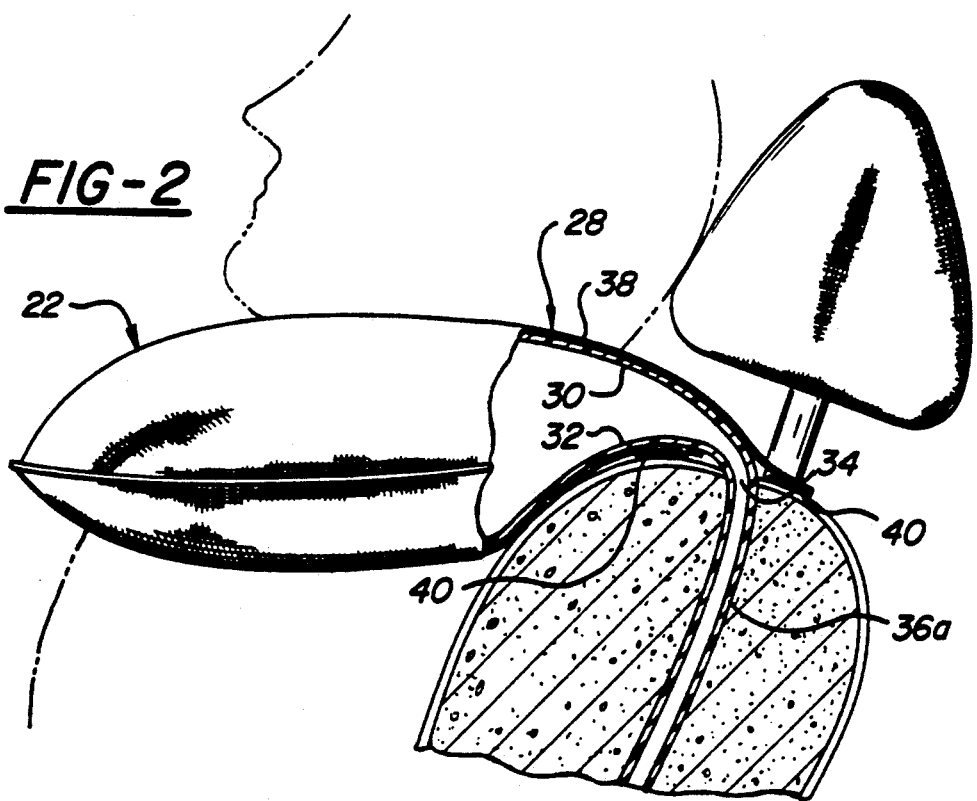
FIG. 2 is a fragmentary, partially sectioned, enlargement of FIG. 1.

Referring now to the drawing and more particularly to FIGS. 1 and 2, an automobile seat 10 comprises a seat portion 12 and a seat back 14 that is disposed at an angle to the seat portion 12 to seat an occupant 16 comfortably. The automobile seat 10 has a padded head restraint 18 that complies with governmental safety standards of the United States of America. This particular head restraint is attached to the seat back by posts 20 that are secured to the seat back 14 in such a fashion that the height of the head rest 18 is adjustable. Adjustable head restraints are well known and consequently a further detailed explanation of the adjustable head restraint 18 is not necessary.

The automobile seat 10 is equipped with an inflatable neck support 22 of this invention that is attached to the crown of the seat back 14. The inflatable neck support 22 that is illustrated in the inflated condition in FIGS. 1 and 2 is a generally U-shaped collar as shown in FIG. 5. The U-shaped collar has a curved back 24 and two side arms 26. The curved back 24 rests on the crown of the seat back 14 and fits comfortably beneath the bulge at the back of the seat occupant's head to support the back of the occupant's neck and head in an generally upright position when the neck rest 22 is properly inflated. The curved back 24 also comfortably supports the occupant's neck and head when they are tilted back at a comfortable angle. The side arms 26 rest on the seat occupant's shoulders and support the sides of the occupant's neck and head in a generally upright position while allowing a comfortable tilt of the head to one side or the other.

The neck support 22 comprises a bladder 28 of impervious material such as vinyl or rubber. The bladder 28 is a two piece construction in which upper and lower U-shaped die cut sheets 30 and 32 are placed one on top of the other and then heat sealed or otherwise suitably secured together in a sealed fashion at 33 to form a flat inflatable bladder as shown in FIG. 2a. The die cut sheets 30 and 32 are sealed and secured together along the entire periphery except for a small inlet opening 34 at the back of the bladder. The back of the bladder 28 is then securely attached to the crown of the seat back 14 beneath the head restraint 18 and the inlet opening 34 is connected to an air tube 36 or 36a for inflating the bladder 28 of the neck support 22 as best shown in FIG. 2.

The bladder 28 may be permanently or detachably secured to the crown of the seat back 14 in any suitable manner. The air tube may be attached to the exterior of the seat back as shown at 36 in FIG. 1 but it is preferably integrated into the interior of the seat back as shown at 36a in FIG. 2. The neck support 22 may be inflated from any suitable source, such as an electric air pump 37 or a hand operated bulb (not shown). It is also possible to use existing equipment such as the lumbar air pump of a high technology automobile seat when the inflatable neck support 22 is attached to such a seat.

In any event the pneumatic source to inflate the neck support 22 and its operator or control are placed so that the seat occupant can manually operate or control the pneumatic source so that the neck support 22 is easily inflated and adjusted to the seat occupant's particular comfort needs.

In this regard, it should be noted that the neck support 22 has an element of adjustability for seat occupants of different heights. The orientation of the neck support 22 with respect to the seat back 14 depends upon the degree of inflation of the bladder 28. The deflated neck support 22 lies flat against the front of the seat back 14 and then rotates counterclockwise to the generally horizontal position shown in FIGS. 1 and 2 as the bladder 28 inflates. The final position or orientation then can be determined by controlling the inflation. More inflation pivots the neck support counterclockwise and upwardly from the position shown to accommodate a taller seat occupant while lesser inflation does not raise the neck support to the position shown to accommodate a shorter seat occupant.

It should also be noted that the inflated neck support 22 is low and oblong so that it is essentially disposed below the head restraint 18 when it engages the seat occupant 16 as shown in FIGS. 1 and 2. Consequently the neck support 22 does not obstruct or otherwise interfere with the head restraint 18 when it is being used by the seat occupant 16.

The neck support 22 also includes a decorative cover 38 that is attached to the crown of the seat back 14 by Velcro ® hook and loop fasteners 40 or any other suitable detachable fastening means such as snaps, grommets and hooks, specialty plastic fasteners, etc. The decorative cover 38 provides a wide range of styling possibilities as it can be made from a variety of materials to match or compliment the material and decor of the seat 10, such as cloth, vinyl, perforated vinyl or leather. Moreover because decorative cover 38 is detachable, it can be cleaned easily. It is also possible to use the bladder 28 itself as the decorative cover by flocking the vinyl, for example.

The inflatable neck support 22 is easily stored when not in use simply by deflating the neck support 22 so that it lays flat against the front of the seat back 14. Alternatively, the deflated neck support 22 could be stored in a suitable storage pocket in the seat 10 simply by making the bladder 28 or the bladder and external air tube 36 detachable from the seat 10.

Figure 3:
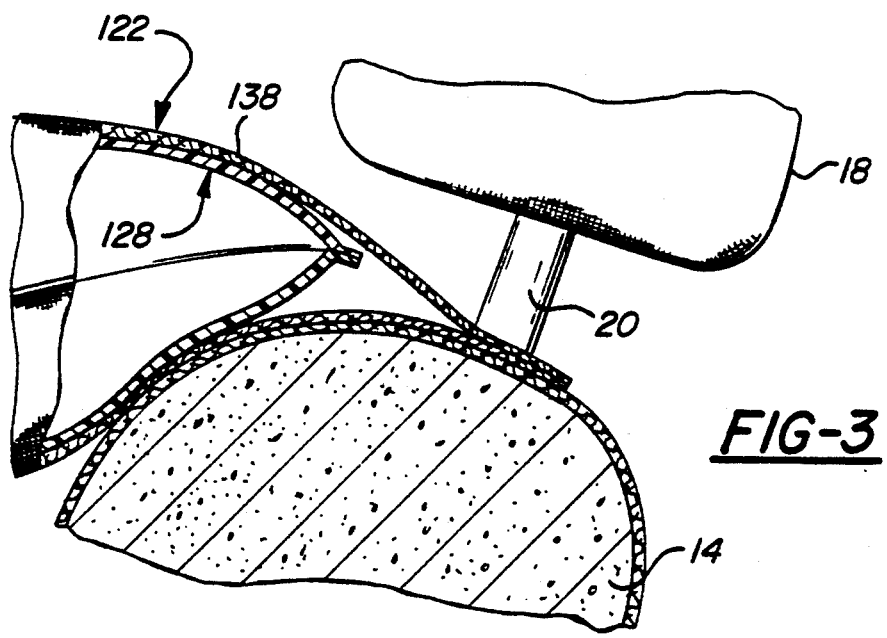
FIG. 3 is a fragmentary, partially sectioned, enlargement of another version of an inflatable neck support of the invention.
Figure 4:
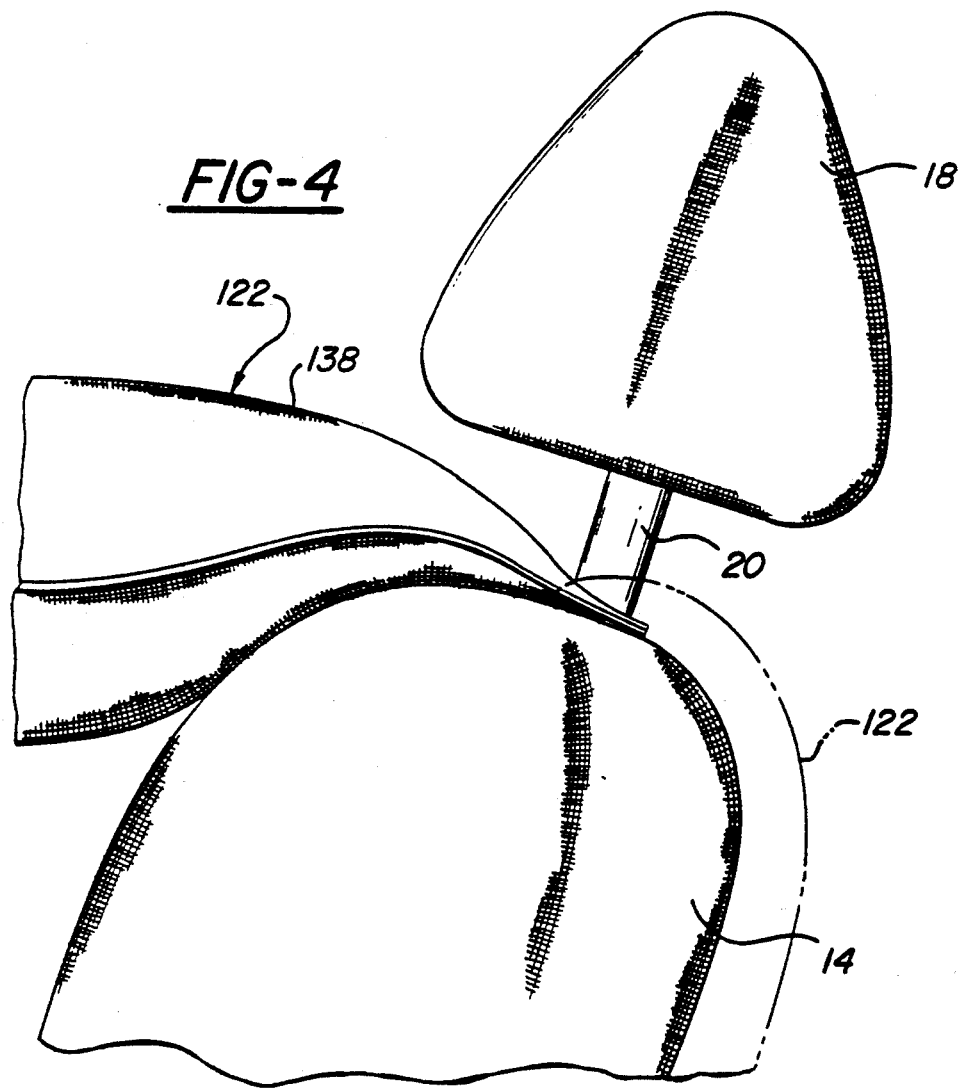
FIG. 4 is another fragmentary enlargement of the inflatable neck support shown in FIG. 3.

Referring now to FIGS. 3 and 4, another version of an inflatable neck support 122 of this invention is shown. The neck support 122 is also a U-shaped collar like the neck support 22 and it also comprises an impervious bladder 128 of two piece construction that has an inlet (not shown) for inflating the neck support 122 by an air tube (not shown). This embodiment also has a decorative cover 138 that can be made in a variety of materials to provide a wide range of styling possibilities.

The decorative cover 138, however, is secured, and preferably permanently attached, to the crown of the seat back 14 solely at the back end as shown in FIG. 3. This provides another alternative for storing the inflatable neck support 122 when it is not in use. In this instance, the neck support 122 is deflated and flattened neck support 122 is folded over the crown of the seat back 14 as shown in phantom in FIG. 4. If desired, the folded over neck support 122 may also be secured to the back of the seat back with Velcro ® hook and loop fasteners 140 or other suitable fasteners, such as snaps.

FIG. 5 shows yet another version of an inflatable neck support 222 of this invention. The neck support 222 is similar to the neck supports 22 and 122. It also is a U-shaped collar that comprises a internal inflatable bladder of two-piece construction (not shown) and a decorative cover 238. The neck support 222 is also inflated through an air tube by an electric air pump or the like that are schematically illustrated at 236 and 237 respectively.

However in this instance the back of the decorative cover 238 is attached to the bottom of an adjustable head restraint 218. Consequently the neck support 222 has a wider range of adjustment for seat occupants of different heights because the neck support 222 can be positioned by adjusting the position of the head restraint 218 as well as adjusting the inflation of the neck support 222 itself.

Moreover, the head restraint 218 is constructed with a downwardly opening pocket 219 for storing the neck support 222 when it is not in use. In this instance the neck support 222 is deflated, folded and stuffed up into the pocket 219 as shown in phantom in FIG. 5.

The foregoing neck supports 22, 122 222 can also be attached to seats having a fixed head restraint including high back seats (not shown) that incorporate the head restraint as an integral part of the seat back itself, such as passenger seats typically used in commercial airlines. The neck supports when used in these applications can be deflated and stored in a variety of convenient ways when not in use. For instance, the neck supports could be stored flat against the front of the seat back, detached and stored in a pocket or stuffed into a pocket provided in the seat back itself.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. An inflatable neck support for a vehicle seat that has a head restraint comprising:
   a U-shaped collar having a curved back for resting on a seat back to support a back of a neck and head of a seat occupant and two side arms for resting on opposite shoulders of the seat occupant to support opposite sides of the neck and head,
   the neck support including an inflatable bladder of impervious material that has an inlet opening for connecting the inflatable bladder to an air supply tube for inflating the bladder,
   means for attaching the inflatable neck support to a seat back or head restraint of a vehicle seat, and
   the inflated neck support being low and oblong so that it is essentially disposed below the head restraint in use so that the inflated neck support does not obstruct or otherwise interfere with functioning of the head restraint.

2. The inflatable neck support as defined in claim 1 wherein the back of the inflatable neck support is securely attached to a crown of the seat back beneath the head restraint.

3. The inflatable neck support as defined in claim 1 wherein the back of the inflatable neck support is securely attached to a bottom of the head restraint.

4. An inflatable neck support for a vehicle seat that has a head restraint comprising:
   a U-shaped collar having a curved back for resting on a seat back to support a back of a neck and head of a seat occupant and two side arms for resting on opposite shoulders of the seat occupant to support opposite sides of the neck and head,
   the neck support including an inflatable bladder of impervious material that has an inlet opening at a back of the bladder for connecting the inflatable bladder to an air supply tube for inflating the bladder, the neck support further including a decorative cover for the inflatable bladder, and
   means for attaching the inflatable neck support to a seat back or head restraint of a vehicle seat so that the inflatable neck support lies flat against the front of a seat back when deflated and pivots upwardly away from the seat back when inflated to various orientations to adjust for seat occupants of different heights.

5. The inflatable neck support as defined in claim 4 wherein the bladder is secured to a crown of the seat back and includes an air tube that is integrated into the seat back and the decorative cover is detachably secured to the seat back so that the cover is removable for easy cleaning.

6. The inflatable neck support as defined in claim 4 wherein the bladder is permanently secured to a crown of the seat back and the neck support is stored deflated and flat against a front of the seat back.

7. The inflatable neck support as defined in claim 4 wherein the bladder is detachably secured to a crown of the seat back so that the neck support is detachable for storage when not in use.

8. The inflatable neck support as defined in claim 4 wherein the neck support is secured to a crown of the seat back solely at the back of the neck support so that the neck support is stored deflated and folded over the crown of the seat back when not in use.

9. The inflatable neck support as defined in claim 4 wherein the inflated neck support is low and oblong so that it is essentially disposed below the head restraint in use so that the inflated neck support does not obstruct or otherwise interfere with functioning of the head restraint.

10. An inflatable neck support for a vehicle seat that has a head restraint comprising:
    a U-shaped collar having a curved back for resting on a seat back to support a back of a neck and head of a seat occupant and tow side arms for resting on opposite shoulders of the seat occupant to support opposite sides of the neck and head,
    the neck support including an inflatable bladder of impervious material that has an inlet opening at a back of the bladder for connecting the inflatable bladder to an air supply tube for inflating the bladder, the neck support further including a decorative cover for the inflatable bladder, and
    means for attaching the inflatable neck support to a seat back or head restraint of a vehicle seat, and
    the neck support being secured to a bottom of the head restraint and the head restraint having a downwardly opening pocket for storage of the neck support when it is deflated and not in use.

11. An inflatable neck support for a vehicle seat that has a head restraint that is attached to the vehicle seat so that it is spaced from a crown of the vehicle seat comprising:
    a U-shaped collar having a curved back that rest on a crown of a seat back and fits comfortably beneath a bulge at a back of a head of a seat occupant to support the back of a neck and the head of the seat occupant in a generally upright position or tilted back at a comfortable angle,
    the U-shaped collar having two side arms for resting on the seat occupant's respective shoulders to support the sides of the seat occupant's neck and head while allowing a comfortable tilt of the head to one side or the other,
    the neck support including an inflatable bladder of impervious material that has an inlet opening at the back of the bladder for connecting the inflatable bladder to an air supply tube for inflating the bladder, the neck support further including a decorative cover for the inflatable bladder, and
    means for attaching the inflatable neck support to the crown of the seat back and below the head restraint that is attached to the vehicle seat so that is spaced from the crown of the vehicle seat and so that the inflatable neck support lies flat against the front of a seat back when deflated and pivots upwardly away from the seat back when inflated to various orientations to adjust for seat occupants of different heights.

12. The inflatable neck support as defined in claim 11 wherein the bladder is permanently secured to the crown of the seat back so that the neck support is stored deflated and flat against a front of the seat back when not in use and the decorative cover is detachably secured to the crown of the seat back so that the cover is removable for easy cleaning.

13. The inflatable neck support as defined in claim 11 wherein the neck support is detachably secured to the crown of the seat back so that the neck support is detachable for storage when not in use.

14. The inflatable neck support as defined in claim 11 wherein the decorative cover is permanently secured to the crown of the seat back solely at the back of the neck support so that the neck support is stored deflated and folded over the crown of the seat back when not in use.

15. The inflatable neck support as defined in claim 11 wherein the inflated neck support is low and oblong so that it is essentially disposed below the head restraint in use so that the inflated neck support does not obstruct or otherwise interfere with functioning of the head restraint.

16. An inflatable neck support for a vehicle seat that has a head restraint comprising:
   a U-shaped collar having a curved back that rests on a crown of a seat back and fits comfortably beneath a bulge at a back of a head of a seat occupant to support the back of a neck and the head of the seat occupant in a generally upright position or tilted back at a comfortable angle,
   the U-shaped collar having two side arms for resting on opposite shoulders of the seat occupant to support opposite sides of the neck and head while allowing a comfortable tilt of the head to one side or the other,
   the neck support including an inflatable bladder of impervious material that has an inlet opening at the back of the bladder for connecting the inflatable bladder to an air supply tube for inflating the bladder, the neck support further including a decorative cover for the inflatable bladder, and
   the inflatable neck support being attached to an adjustable head restraint that is attached to the seat back so that the inflatable neck support moves with the adjustable head restraint.

17. The inflatable neck support as defined in claim 16 wherein the inflated neck support is low and oblong so that it is essentially disposed below the head restraint in use so that the inflated neck support does not obstruct or otherwise interfere with functioning of the head restraint.

18. An inflatable neck support for a vehicle seat that has a head restraint comprising:
   a U-shaped collar having a curved back that rests on a crown of a seat back and fits comfortably beneath a bulge at a back of a head of a seat occupant to support the back of a neck and the head of the seat occupant in a generally upright position or tilted back at a comfortable angle,
   the U-shaped collar having two side arms for resting on opposite shoulders of the seat occupant to support opposite sides of the neck and head while allowing a comfortable tilt of the head to one side or the other,
   the neck support including an inflatable bladder of impervious material that has an inlet opening at the back of the bladder for connecting the inflatable bladder to an air supply tube for inflating the bladder, the neck support further including a decorative cover for the inflatable bladder,
   means for attaching the inflatable neck support to a head restraint that is attached to the seat back so that it is spaced from a crown of the seat back,
   the head restraint being adjustable, and
   the inflatable neck support being permanently attached to the head restraint and the head restraint having a downwardly opening pocket for storing the neck support when it is not in use.

* * * * *